3,092,496
ANIMAL FEEDS

Herbert G. Luther and John R. De Zeeuw, Terre Haute, Ind., assignors to Chas. Pfizer & Co., Inc., New York, N.Y., a corporation of Delaware
No Drawing. Filed July 18, 1958, Ser. No. 749,343
6 Claims. (Cl. 99—2)

This invention is concerned with animal feeds which are particularly effective in bringing about rapid and healthy growth of animals, particularly certain domestic animals grown primarily for the production of meat.

In particular, this invention is concerned with novel animal feeds which comprise standard, nutritionally balanced feed compositions supplemented with certain vegetable products which have not hitherto been included in animal feeds. The materials which are used to supplement the complete animal diets are the roots of certain species of the plant Rauwolfia, preferably in finely divided or ground form, in particular the species R. heterophylla, R. vomitoria, R. hirsuta, and so forth, which are generally sources of the alkaloid reserpine. Rather than utilizing the ground root of the plant, concentrates of the active material may be utilized for this purpose. Concentrates are prepared, for instance, by extraction of the root with polar organic solvents, particularly lower alcohols. Removal of the solvent leads to a residual material that is of higher activity per unit weight as a supplement to animal feeds. Further purification procedures may be applied to the root extracts, for instance chromatography on such adsorbents as silica gel or alumina. Alternatively, highly purified or cyrstalline alkaloids derived from the various Rauwolfia species have been found to be very highly active in stimulating growth of animals when added to an adequate animal diet. Particularly effective is reserpine. The crude root or concentrates thereof may vary somewhat in potency with the species of Rauwolfia used for preparation of the material. The optimum proportion of any given material may be determined by a limited amount of testing using procedures such as described in the examples below.

A standard feed composition to which Rauwolfia or derived material such as concentrates thereof or reserpine is added to prepare the new feed compositions of this invention will vary to some extent depending upon the animal with which the product is to be used. However, these materials, in general, should contain nutritionally balanced quantities of carbohydrates, proteins, vitamins and minerals. Grains such as ground grain and grain by-products, animal protein substances such as fish meal and meat scraps, vegetable proteins like soy bean oil meal or peanut oil meal, vitaminaceous materials such as vitamin A and D mixtures, riboflavin supplements and other vitamin B complex members, bone meal and limestone are all useful for the preparation of such balanced feeds. With ruminant animals and some of the larger non-ruminants like swine, the usual balnced diets may be silage, pasturage, hay, ground yellow corn, cob meal, etc. In the case of poultry, e.g. turkeys, ducks, chickens, etc., balanced diets may be prepared following the suggested formulae set forth on page 6 of the authoritative pamphlet issued by the National Research Council (Washington, D.C., June 1944), and entitled "Recommended Nutrient Allowances for Poultry." For instance, feed compositions are recommended to contain roughly between 50 and 80% of grain, between 3 and 10% of animal protein, between 5 and 30% of vegetable protein, between 2 and 4% of minerals, together with supplemental vitamins. When these types of balanced feeds, containing added Rauwolfia root or one of its derived products, are used, animals reach a marketable weight in a shorter time than on the usual unsupplemented standard feed compositions and better feed efficiency and more economical use of farm space are obtained. In some cases the increase in rate of growth amounts to 10% or more during the ordinary period allotted for development of the animal to market weight. The Rauwolfia root (or equivalent material) may be administered alone to the animal, but it is more convenient and effective to use the material in the animal's feed.

In preparing the supplemented animal feeds of this invention, it has now been found that as little as 0.003% by weight of ground Rauwolfia root therein has a definitely beneficial effect upon the rate of growth of various non-ruminant animals, including, as indicated above, poultry, pigs, dogs, and so forth. In the case of ruminants such as cattle and sheep, as little as 0.00005% of Rauwolfia root has a beneficial effect on growth. If a purified form of the Rauwolfia product is used to supplement the animal feeds, a proportionately smaller amount of the material may be used. In general, this is roughly in proportion of the reserpine content of the concentrate, although other materials contained in the Rauwolfia root apparently participate in the animal growth stimulation. Higher proportions of the ground root or its equivalent of more highly purified products may be utilized as a supplement in the animal feed. However, if a proportion appreciably higher than about 0.5% in the case of non-ruminants and 0.05% in ruminants, calculated as ground root is used, there may be a lessening of the growth of the animals.

The supplementation of animal diets with Rauwolfia root or equivalent products may conveniently be combined with supplementation by antibiotics and other growth stimulatory materials. In some cases this results in an even greater increase in the rate of growth over that obtained by merely supplementing the diet of the animals with one of these growth stimulatory materials.

The supplemented feeds of this invention may be prepared by incorporating the active supplement in various ways into normal complete diets for the type of animal in question. The finely divided ground or powdered Rauwolfia root may be mixed with other feed supplements such as vitamins, antibiotics, minerals and other materials of this nature in a feed supplement which is supplied to grain mills or to feed manufacturers who may then incorporate it into the finished feed to be supplied to the animals by the farmer. Blending of such materials may be accomplished in the usual type of apparatus used for the preparation of dry feed products. For young animals, the Rauwolfia or equivalent material may be incorporated into liquid or semi-liquid feeds or mashes in the form of a suspension of the active material.

The following examples are given by way of illustration and are not to be regarded as limitations of this invention, many variations of which are possible without departing from its spirit or scope. This application is in part a continuation of application Serial No. 547,294, filed November 16, 1955, and now abandoned.

Example I

Groups of chickens (White Rocks crossed with New Hampshires) were fed a diet which was complete in all of the usual nutritional materials and which had the following composition.

| | |
|---|---|
| Ground yellow corn _____percent by wt.___ | 60.3 |
| Soy bean oil meal_____do____ | 33.0 |
| Alfalfa leaf meal_____do____ | 1.0 |
| Dicalcium phosphate_____do____ | 3.0 |
| Calcium carbonate_____do____ | 1.0 |
| Iodized salt_____do____ | 0.2 |
| Vitamin-mineral-amino acid antibiotic mix to furnish the following per 100 pounds of feed: | |
|   Oxytetracycline _____grams__ | 0.5 |
|   Pencillin (as procaine salt)_____do____ | 0.25 |
|   Manganese sulfate_____do____ | 8 |
|   DL-methionine _____do____ | 22.7 |
|   Riboflavin _____milligrams__ | 130 |
|   DL-calcium pantothenate_____do____ | 930 |
|   Niacin _____do____ | 1400 |
|   Pyridoxine _____do____ | 130 |
|   Vitamin B$_{12}$_____do____ | 1 |
|   Choline chloride_____grams__ | 22.7 |
|   Vitamin A_____units__ | 300,000 |
|   Vitamin D$_3$_____do____ | 25,000 |

Further groups of the same types of chicks were fed on an identical diet to which had been added 0.01% by weight of ground *Rauwolfia heterophylla* root. A further group of chicks was fed the identical diet and 0.1% by weight of ground *Rauwolfia heterophylla* was uniformly incorporated throughout the feed. The following table summarizes the results that were obtained during the course of this experiment.

| Diet | Average weight (grams) | | | | | Feed Efficiency | Growth Index |
|---|---|---|---|---|---|---|---|
| | Initial | 1 wk. | 2 wks. | 3 wks. | 4 wks. | | |
| Basal_____ | 40 | 59 | 113 | 180 | 274 | 2.57 | 100 |
| 0.01% Rauwolfia___ | 40 | 65 | 124 | 201 | 299 | 2.54 | 111 |
| 0.1% Rauwolfia____ | 40 | 64 | 126 | 197 | 296 | 2.64 | 111 |
| 0.1% Rauwolfia +0.45% fermentation product___ | 39 | 72 | 149 | 235 | 346 | 2.01 | 136 |

In the above example the average weight of each group at the end of weekly intervals is given in grams. These weights are on a 50-50 sex basis. The feed efficiency refers to the ratio of weight of feed fed to the degree of increased weight. The growth index is the rate of increase in growth as compared to that obtained with the basal diet assigned a value of 100. It is evident from this table that animal diets supplemented with Rauwolfia root are definitely more effective in stimulating animal growth than is the case with a complete animal diet unsupplemented with this material.

Example II

The procedure described in Example 1 was repeated utilizing in place of ground Rauwolfia roots a dry extract prepared from the roots with hot methanol. The concentrate was used in the diet at a concentration of 0.005% by weight. Stimulation of animal growth comparable to that obtained in Example I was observed with the use of the concentrate.

Example III

An experiment similar to that described in Example I was repeated utilizing crystalline reserpine at a concentration of 0.0001% by weight in the poultry feed. The resulting stimulation of the rate of chick growth was comparable to that obtained in Example I.

Example IV

For 14 weeks four groups of eight pigs each were fed the basal ration tabulated below, and three of the four groups also had their diets supplemented with varying amounts of ground *Rauwolfia vomitoria* root. Results were as follows:

| Rau. vom. (percent by wt. feed) | Average Daily Gain (lbs.) | Growth Index | Feed Efficiency |
|---|---|---|---|
| 0_____ | 1.63 | 100 | 3.51 |
| .0032_____ | 1.73 | 106 | 3.61 |
| .032_____ | 1.70 | 104.5 | 3.52 |
| .32_____ | 1.68 | 103.0 | 3.42 |

BASAL RATION

| Ingredient: | Percent (by weight) |
|---|---|
| Yellow corn_____ | 60.2. |
| Rolled oats_____ | 20. |
| Soybean meal_____ | 13. |
| Fish meal_____ | 0.96. |
| Dehy. alfalfa_____ | 2.1. |
| Meat bone scrap_____ | 1.44. |
| Minerals_____ | Traces. |
| Vitamins_____ | Traces. |
| Terramycin _____ | 10 gm./ton. |

Example V

A group of twelve lambs was provided the following basal ration, made into 3/8 inch pellets, self-fed.

| Ration: | Percent by weight |
|---|---|
| Cottonseed hulls_____ | 20.0 |
| Sun cured alfalfa meal_____ | 20.0 |
| Cane molasses_____ | 10.0 |
| Ground corn_____ | 47.0 |
| Soybean oil meal_____ | 2.0 |
| Urea _____ | 1.0 |
| | 100 |

Another group of twelve lambs was fed this same feed in which had been incorporated ground *Rauwolfia vomitoria* root at a concentration of 3 grams per ton. After 70 days the lambs were slaughtered and results evaluated as follows:

| | Control | Rauwolfia vomitoria, 3 gm./ton |
|---|---|---|
| Initial Wt., lbs_____ | 68.3 | 69.0 |
| Final Wt., lbs_____ | 97.4 | 99.5 |
| Av. Daily Gain, lb_____ | .415 | .436 |
| Growth Index_____ | 100 | 109 |
| Av. Daily Feed_____ | 3.90 | 3.79 |
| Feed/lb. gain_____ | 9.38 | 8.70 |
| Feed Efficiency Index_____ | 100 | 91 |
| Dressing percent [1]_____ | 47.97 | 50.37 |
| Grade [2]_____ | 9.17 | 9.50 |
| Lamb Carcasses_____ | 3 | 9 |
| Yearling Carcasses_____ | 9 | 3 |

[1] Dressing percent based upon last experimental weight and cold carcass weight.
[2] Carcass grades:

| Choice | Good |
|---|---|
| 12 | 9 |
| 11 | 8 |
| 10 | 7 |

Example VI

Four groups of four Hereford steers each were fed standard, nutritionally balanced diets supplemented with varying quantities of ground root of Rauwolfia vomitoria. After 84 days the results were as follows:

|  | Control | R. V. 5 gm./ton | R. V. 25 gm./ton | R. V. 125 gm./ton |
|---|---|---|---|---|
| Growth: |  |  |  |  |
| Av. Initial Wt. | 704 | 693 | 689 | 671 |
| Av. Final Wt. | 937 | 951 | 959 | 906 |
| Total Gains/Head | 233 | 258 | 270 | 235 |
| Av. Daily Gain | 2.77 | 3.07 | 3.21 | 2.81 |
| Percent Increase |  | 11 | 16 | 1 |
| Feed Efficiency: |  |  |  |  |
| Lb. Feed/lb. Gain | 8.38 | 7.87 | 8.12 | 8.13 |
| Improvement, percent |  | 6 | 3 | 3 |
| R.V. Intake/Head/Day, milligrams |  | 5 | 25 | 125 |
| Reserpine Intake/Head/Day, micrograms |  | 12 | 60 | 300 |
| Carcass Quality: |  |  |  |  |
| Dressing percent (See Example V) | 62.0 | 62.0 | 62.0 | 61.0 |
| Grade (See Example V) | 10.0 | 9.5 | 10.25 | 9.5 |

Finishing ration:
  ½″ ground ear Corn free choice.
  Supplement—2 lb./head/day.
    Ingredient—                                           Pounds
      Soybean oil meal (44%) _____ 1180
      Dehy. alfalfa meal (17%) _____ 400
      Dried molasses (40%) _____ 200
      Urea 262 _____ 100
      Dicalcium phosphate _____ 40
      Ground limestone _____ 35
      Trace mineralized slat _____ 45
      Vitamin A (A-250 P), 40 gms.

*Example VII*

One group of ten Hereford steers was fed the ration and supplement tabulated below together with 10 mg. per day per head of diethylstilbesterol and 80 mg. per day per head of oxytetracycline. A second group of ten comparable steers was fed the same ration, supplement, hormone and antibiotic and, in addition, 60 mcg. per day per head of reserpine. Results were as follows:

|  | Control | Reserpine |
|---|---|---|
| Growth: |  |  |
| Av. Initial Wt. (lbs.) | 751 | 746 |
| Av. Final Wt. | 1,068 | 1,106 |
| Av. Daily Gain | 2.88 | 3.25 |
| Percent Increase |  | 13 |
| Feed Efficiency: |  |  |
| Lb. Feed/lb. gain | 8.57 | 8.24 |
| Improvement, percent |  | 4 |
| Carcass Quality: |  |  |
| Dressing, percent | 63.0 | 63.6 |
| Carcass Grade | 9.7 | 11.6 |

Experimental ration:
  Ground corn and cob meal (80-20) free choice.
  Hay—free choice.
  Supplement—3 lb./head daily.
    Ingredient—                                        Percent by wt.
      Soybean oil meal (44%) _____ 59
      Dried molasses (40%) _____ 10
      Urea (262) _____ 5
      Dehy. alfalfa meal (17%) _____ 20
      Dicalcium phosphate _____ 2
      Salt trace minerals _____ 2.25
      Ground limestone _____ 1.75
      Vitamin A (A-250 P) 2 gm.

*Example VIII*

Thirty-two beef steers were fed the following rations plus 80 mg. per day per head of oxytetracycline.

Rations:
  0–84 days—                                    Percent by wt.
    Gr. corn cobs _____ Self fed.
    Corn and cob meal _____ 4 lb.
    Protein suppl. _____ 3 lb.
  84–168 days—
    Corn and cob meal _____ Self fed.
    Hay _____ 2 lb.
    Protein suppl. _____ 3 lb.

Protein supplement:                       Percent by wt.
  Soybean oil meal _____ 62
  Dried molasses _____ 10
  Urea 262 _____ 2
  Dehy. alfalfa meal _____ 20
  Dical. phosphate _____ 2
  Trace mineral salt _____ 2.25
  Ground limestone _____ 1.75
  Vitamin 9 (A–250 P) 40 gm./ton.
                                                  100

Crude protein _____ 38

Eight of these thirty-two cattle were also fed 25 mg. per day per head of ground *Rauwolfia vomitoria* root, and eight were fed 60 mcg. per day per head of crystalline reserpine. The remaining sixteen steers were kept as controls. Results after 168 days were as follows:

|  | Average Daily Gain, Lb. | Lb. Feed/ Lb. Gain | Carcass Grade |
|---|---|---|---|
| Control | 2.02 | 11.36 | 8.25 |
| Rau. vom. | 2.24 | 10.63 | 9.0 |
| Reserpine | 2.47 | 9.70 | 8.75 |

What is claimed is:

1. A growth-promoting animal feed which comprises a standard, nutritionally balanced feed composition and a Rauwolfia-derived substance selected from the group consisting of Rauwolfia roots, concentrates thereof and reserpine, in a concentration between about 0.00005% and 0.05% by weight calculated as Rauwolfia root when said animal feed is for ruminants and between 0.003% and 0.5% by weight when said animal feed is for non-ruminants.

2. A growth-accelerating animal feed which comprises a nutritionally balanced feed composition and between about 0.00005% and 0.05% by weight of the growth-stimulating activity of Rauwolfia roots when said animal feed is for ruminants and between about 0.003% and 0.5% by weight of the growth-stimulating activity of Rauwolfia roots when said animal feed is for non-ruminants.

3. A growth-accelerating animal feed which comprises grain, animal protein, vegetable protein, vitamins, minerals, and at least one form of the growth-stimulating activity of Rauwolfia roots, in a concentration of between about 0.00005% and 0.05% by weight calculated as Rauwolfia root when said animal feed is for ruminants and between about 0.003% and 0.5% by weight when said animal feed is for non-ruminants.

4. A process for stimulating the growth of an animal which comprises orally administering to said animal a nutritionally balanced feed composition and a Rauwolfia-derived substance selected from the group consisting of ground Rauwolfia roots, concentrates thereof and reserpine, in a concentration calculated as Rauwolfia root between about 0.00005% and 0.05% by weight when said animal is a ruminant and between about 0.003% and 0.5% when said animal is a non-ruminant.

5. A growth-promoting animal feed which comprises a nutritionally-balanced feed composition and reserpine in an amount of at least sufficient to enhance the growth of the animal.

6. A growth-promoting poultry feed which comprises a nutritionally-balanced feed composition and reserpine in an amount sufficient to enhance the growth of the poultry.

References Cited in the file of this patent
UNITED STATES PATENTS
2,776,889     Standem _____ Jan. 8, 1957

OTHER REFERENCES

Wilkins: Ann. N.Y. Acad. Sci. 59 (1954), pages 36–44.